Patented Sept. 3, 1935

2,013,075

UNITED STATES PATENT OFFICE 2,013,075

ORGANIC COLORING MATERIAL COMPRISING AN AZO COMPOUND AND AN ARYLATED ROSIN AS THE SUBSTRATUM

Alfred Siegel, Hillside, N. J., assignor to Krebs Pigment & Color Corporation, Newark, N. J., a corporation of Delaware No Drawing. Application October 16, 1933, Serial No. 693,823

7 Claims. (Cl. 134—58.5)

The present invention comprises novel azo lakes and pigments in which the azo compound is combined with a substratum comprising an arylated rosin, and processes of making the same.

As is well known, rosin or abietic acid is an unsaturated compound containing ethylenic linkages or double bonds, generally believed to be two in number. (Ruzicka, Helvetica Chimica Acta, vol. 6,—(1924)—p. 1077). New arylated derivatives of rosin are described by M. M. Brubaker in U. S. application Ser. No. 600,366, filed March 21, 1932, in which the unsaturation is partially or completely eliminated by arylation.

Such arylated rosins are made, according to the Brubaker application, by reacting the rosin with the arylating agent, such as benzene or xylene, in the presence of aluminum chloride or other suitable anhydrous metallic chloride. In carrying out the arylation, it is preferable to use equimolecular proportions of aluminum chloride and the rosin. The rosin is dissolved in an amount of arylating agent (1200–1500 cc. per gram mol. of the gum) sufficient to furnish excess solvent medium as well as arylating agent. The condensation is carried out at about 50° C. in equipment not attacked by hydrochloric acid. After the aluminum chloride has been added slowly, the mixture is warmed to 70–80° C. for about 1½ hours. The intermediate product formed with the aluminum chloride is then cautiously decomposed with 20% hydrochloric acid. After dilution with cold water, the hydrocarbon layer is separated from the water layer and washed until nearly free of hydrochloric acid. The excess hydrocarbon is distilled off, the last traces being removed preferably at reduced pressure, leaving the desired arylated rosin behind. This product is different from the original gum, to a more or less marked degree, in both physical and chemical properties. Both the iodine number and the acid number are lower. The product also has a different softening point and a different degree of hardness and thermoplasticity from the original rosin. Arylated rosin is less susceptible than the original rosin to atmospheric oxidation.

The term "aryl", as used in this application, applies to any aromatic hydrocarbon residue, i. e., any aromatic hydrocarbon less one nuclear hydrogen atom.

I have jointly with E. R. Allen shown in U. S. Patent Re. 18,590 that the development of azo lakes and pigments in the presence of metallic rosinates produces novel products in which the rosinate acts as a non-diluting substratum and that these novel lakes and pigments are distinguished by bright, clear tones which are non-bronzing when the lakes are used in printing inks.

I have found that the chemically and physically different arylated rosins act in a manner similar to natural rosin when the development of the azo lake or pigment is made in the presence of an arylated rosin compound, which then acts as a substratum for the lakes and pigments.

The process of my invention comprises, therefore, developing by heating an aqueous suspension of an insoluble azo coloring compound in the presence of an insoluble salt, or soap, of an arylated rosin.

By the term development I refer to that step of the process of making azo lakes and pigments when an insoluble azo compound is heated in aqueous suspension with a substratum. During this operation some physical and chemical changes take place, the azo compound combines with the substratum and the full tinctorial value of the pigment is obtained.

The suspension of the azo compound and the substratum can be prepared in any desired manner.

I can, for instance, add an aqueous solution of an alkali metal soap of an aryl rosin to either the diazo compound, the coupling compound or the reaction product of the two and then jointly precipitate an insoluble alkaline earth or heavy metal salt of the azo compound and of the arylated rosin, whereby I obtain a suspension ready for development. I can also separately prepare the water insoluble salt of the azo compound and the water insoluble salt of the arylated rosin and with or without preliminary purification, mix the two in water to form a suspension which by heating develops the finished lake or pigment. I can also prepare such a suspension in any other manner which will be obvious to those skilled in the arts.

Calcium, barium, aluminum, zinc, lead, etc. salts are well adapted to form insoluble arylated rosins useful for the production of my novel lakes and pigments. Similarly when using salt forming azo compounds I preferably use their insoluble alkaline earth and heavy metal salts.

Whichever way such a suspension is produced I produce the lake by heating the suspension, for instance, to the boiling point, until definite change in the color and physical appearance of the suspended material takes place.

It is in many instances advisable to add to the suspension a dispersing agent which facilitates the formation of the lake or pigment. Soaps, sulfonated animal and vegetable oils, such as Turkey red oil, sulfonated castor oil, sulfonated cotton seed oil, sulfonated fish oil, are well adapted for use as dispersing agents in the development of my novel lakes and pigments.

The development can be carried out in neutral solution, but in most instances I prefer to have free alkali present during development, which facilitates the formation of the lakes and pigments.

My invention is applicable to various azo dyestuffs of the following three types which are capable of being transformed into pigments.

*Mono-azo monosulfonic acids.*—The sulfonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2-naphthylamine 1-sulfonic acid with beta naphthol (Lithol red, Colour Index No. 189).
2. Diazotized para-nitraniline ortho-sulfonic acid with beta naphthol (Lake red P, Colour Index No. 158).
3. Diazotized 2-naphthylamine 1-sulfonic acid with salicylic acid.
4. Diazotized para-toluidine metasulfonic acid with the anilide of beta oxynaphthoic acid.

*Mono-azo monocarboxylic acids.*—The carboxylic acid group may be in either component and the component not containing the carboxylic group may or may not contain a sulfonic acid group. These toners are more or less soluble as their free acids or alkali metal salts and are rendered insoluble by treatment with an alkaline earth or heavy metal salt. For example, such toners can be formed by coupling 1. Diazotized para-toluidine metasulfonic acid with beta oxynaphthoic acid (Lithol rubine, Colour Index No. 163).
2. Diazotized para-nitro ortho-toluidine with beta oxynaphthoic acid.
3. Diazotized anthranilic acid with beta naphthol (Lake red D, Colour Index No. 214).
4. Diazotized 2-naphthylamine 1-sulfonic acid with beta oxynaphthoic acid (Lake bordeaux B, Colour Index No. 190).

*Azo pigment dyestuffs.*—This type of toner is a substantially insoluble dyestuff produced in the coupling itself and does not contain salt-forming groups. The following illustrative cases are formed by coupling 1. Diazotized para-nitro-aniline with beta naphthol (Para red, Colour Index No. 44).
2. Diazotized meta-nitro para-toluidine with aceto-acetanilide (Hansa yellow G).
3. Diazotized para-nitro ortho-toluidine with beta naphthol (Pigment orange R, Colour Index No. 68).
4. Diazotized alpha-naphthylamine with beta naphthol (Autol red RL, Colour Index No. 82).

For the sake of convenience and in accordance with commercial and industrial practice I use the term oxy-naphthoic acid herein to designate the 2.hydroxynaphthalene-3.carboxylic acid.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine meta-sulfonic acid with beta oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap Para reds (so-called Grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compounds which only by association with a substratum become a pigment, or lake, in both instances the azo compound is substantially water insoluble before developing or becomes so during development.

The products of the present invention combine to a certain extent the color strength and properties of a toner with the properties usually found in a lake formed with an inorganic substratum.

The amount of arylated rosin substratum for use in my novel lakes and pigments can vary within wide limits. A few per cent, for instance 5% or more, of an insoluble metallic salt of an arylated rosin produces a noticeable improvement in the tinctorial properties of the lake. When using larger amounts, say for instance up to 50% figured on the finished product, the metallic arylated rosin produces in some instances pigments of substantially the same tinctorial strength as a pigment containing little or no substratum.

My novel azo lakes and pigments are characterized chemically by containing as the substratum a substantial amount of a water insoluble metallic salt of an arylated rosin. They have a brighter and cleaner tone and are of a greater tinctorial strength than pigments made with a similar amount of an inorganic substratum.

The following are a few examples of how I produced my novel lakes and pigments and the pigments themselves.

It will be understood that my invention is not limited to these examples or to the specific manipulation steps disclosed therein. Similar results are obtained with other azo compounds which are capable of forming lakes and pigments by development of the pigment in the presence of an inorganic pigment.

Instead of the calcium and barium salts used in the following examples I can use other alkaline earth or heavy metal salts to precipitate the azo compound and the metallic salt of the arylated rosin.

*Example I.*—A solution of the sodium salt of 2-naphthylamine 1-sulfonic acid corresponding to 111.5 parts of the free acid, is diazotized in the usual manner with 39 parts of sodium nitrite and 204 parts of muriatic acid 20° Bé. In a separate container a solution of 80 parts of beta naphthol and 51 parts of caustic soda is prepared and made to a volume corresponding to approximately 2500 parts of water. After the temperature of this solution has been adjusted to 25° C. the diazo suspension referred to above, is introduced into the beta naphthol solution. The coupling proceeds rapidly and to good completion. It is evident from the amounts of ingredients stated above, that the azo reaction is completed in an alkaline condition. The charge is then heated to 40° C.

To a solution of 30 parts of caustic soda in 325 parts of water is added 75 parts of phenyl rosin. The volume is then brought to the equivalent of aproximately 1900 parts of water, the preparation boiled to complete the saponification. This preparation of phenyl rosin soap is then run into the charge of the azo dyestuff, described above, and the temperature and volume of the combining solutions so adjusted that the temperature of the resulting charge does not drop below 40° C.

The charge is then precipitated with a solution of 240 parts of barium chloride in 5000 parts of water at the boil, boiled to insure development of the lake, and the product then washed, filtered, dried and ground in the usual manner.

The yield is approximately 305 parts of dry product compared to 245 parts in a charge prepared without phenyl rosin soap. The phenyl rosin lake is equal in covering power (determined by tinting in white) to a product obtained without the use of phenyl rosin soap, and is equal in this respect to the ordinary commercial barium lithol toner. It is much brighter in shade, cleaner in tone, and when ground into lithographic varnish to produce a printing ink, the latter product gives a print which possesses a bright, fiery, bronze-free tone. In other words, this new product possesses the strength of a toner and the printing qualities of a lake.

*Example II.*—A solution of 41.8 parts of the sodium salt of para toluidine meta sulfonic acid (CH₃:SO₃:NH₂=1:3:4) is diazotized with 14.4 parts of nitrite of soda and 52 parts of 20° Bé. muriatic acid.

40 parts of beta oxynaphthoic acid (OH:COOH=2:3)

are dissolved in a solution of 16.3 parts of caustic soda in 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of phenyl rosin are added to a solution of 6.5 parts of caustic soda in 400 parts of water, and the solution boiled until the formation of the soluble phenyl rosin soap is complete. This phenyl rosin soap solution is then added to the dye solution and the temperature adjusted to 40° C., and stirred 15 minutes.

In a separate container 80 parts of calcium chloride are dissolved in 2000 parts of water and the temperature adjusted to 27° C., and into this is then run in 10 minutes the dye-soap solution. There is then added 41 parts of caustic soda in 500 parts of water and the slurry stirred for 15 minutes. The charge is then heated to the boil and digested at this temperature for ½ hour, after which it is washed, filtered, and dried in the usual manner. The yield is approximately 128 parts of pigment compared with 92 parts in a charge carried out in exactly the same way but without the phenyl rosin. The difference represents the aryl rosin substratum contained in the finished product.

This lake is stronger than a corresponding lake made from the same amount of azo compound and a mineral substratum. It is superior in richness of shade, clarity of tone and freedom from bronze on the printing tone obtained from printing inks prepared from it.

*Example III.*—69 parts of para nitro aniline are dissolved in 60 parts of muriatic acid (100%) and 300 parts of water at 80–90° C., and the solution is then allowed to flow in a fine stream onto 625 parts of ice and water with good stirring. The resulting suspension is then diazotized in the usual manner with 37.5 parts of sodium nitrite; after stirring approximately 20 minutes, the diazo preparation is partially neutralized with 25 parts of whiting and the stirring continued for 15 minutes.

To a solution of 7 parts of caustic soda in 500 parts of water, is added 27.5 parts of tolyl rosin, and boiled ½ hour. This solution is then added to a solution of 25 parts of barium chloride in 1225 parts of water at the boil and boiled 15 minutes. Previously, to a solution of 26 parts of caustic soda and 26 parts of soda ash (93%) in 400 parts of water is added 71.5 parts of beta naphthol and the mixture heated until a clear solution is obtained. To this solution is also added a mixture of 6.5 parts of para soap in 65 parts of water, and the resulting solution is added in a fine stream to the tolyl rosin solution. The temperature and volume of the resulting mixture is adjusted to 15° C. and 2900 parts of solution, and the above diazo solution is run in whereupon azo coupling proceeds quickly and smoothly to completion. After stirring a short time the dyestuff is brought rapidly to the boil and boiled 5 minutes, the product is then flooded, washed, and dried in the usual manner.

The yield is approximately 192 parts of pigment compared with 160 parts in a charge carried out in exactly the same way without the tolyl rosin soap. The pigment contains about 17% of the barium salt of tolyl rosin.

The new plate pigment is of good strength, has a clean and bright printing tone and good texture.

*Example IV.*—A solution of para nitro ortho toluidine is prepared by dissolving 77.5 parts of para nitro toluidine in a mixture of 55 parts of muriatic acid (100%) and 750 parts of water at 60° C. This solution is then poured onto ice and adjusted to 0° C., the resulting solution or suspension is diazotized in the usual manner with 37.5 parts of sodium nitrite.

145 parts of the anilide of beta oxynaphthoic acid (OH:CONHC$_6$H$_5$=2:3) are dissolved in a solution of 43 parts of caustic soda and 500 parts of water. To this are added 70 parts of sodium acetate, and after stirring to solution; 15 parts of para soap in 125 parts of water; and then 37.5 parts of xylyl rosin dissolved at the boil in a solution of 6 parts of caustic soda and 500 parts of water and boiled until saponification is complete. The resulting solution is adjusted to 5000 parts of solution at 4° C., and the above diazo preparation run in rapidly. This is followed by a solution of 30.5 parts of caustic soda in 375 parts of water, and the entire mixture is brought to 40° C. in 20 minutes, at which temperature the azo coupling proceeds rapidly to completion. After stirring a few minutes the dyestuff is made to 40,000 parts of solution at 27° C., and acidified with 12.5 parts of glacial acetic acid. After this is added in 10 minutes a solution of 75 parts of calcium chloride in 500 parts water. There is then added 20.5 parts of caustic soda in 250 parts of water and the slurry stirred for 15 minutes. The charge is then developed by heating to the boil and digested at this temperature for ½ hour, after which it is washed, filtered, and dried in the usual manner.

The yield is approximately 249 parts of pigment compared with 218 parts in a charge carried out in exactly the same way but without the xylyl rosin soap. The pigment contains about 12% of the calcium salt of xylyl rosin. The lake pigment possesses the characteristic tinctorial properties with a high bronze, also good strength and texture.

*Example V.*—A mixture of 68.5 parts of anthranilic acid and 1125 parts of water are stirred to a thin paste, and 22.5 parts of muriatic acid (100%) are added, the resulting solution is iced to 3° C., and diazotized in the usual manner with 37 parts of sodium nitrite.

99 parts of beta oxynaphthoic acid (OH:COOH=2:3)

are dissolved in a solution of 46 parts of caustic soda and 500 parts of water. The temperature and volume of the beta oxynaphthoic acid solution is adjusted to 15° and 3000 parts of solution, and the above described diazo preparation is then run in whereupon the azo coupling proceeds to completion. The dye slurry is made to 13,000 parts of solution at 40° and to this is added a solution prepared by adding 75 parts of phenyl rosin to a solution of 14 parts of caustic soda in 1500 parts of water and boiling for ½ hour. After stirring a short time the dye slurry is precipitated by running it into a boiling solution of 200 parts of calcium chloride and 5000 parts of water, boiled 20 minutes to insure development and washed, filtered, and dried in the usual manner.

The yield is approximately 230 parts of dry product compared to 180 parts in a charge prepared without the phenyl rosin soap. The lake pigment contains about 22% of the calcium salt of phenyl rosin as a metal substratum, and when ground into a litho varnish gives a bright, clean printing tone.

*Example VI.*—A solution of para nitro ortho toluidine is prepared by dissolving 77.5 parts of para nitro ortho toluidine in a mixture of 55 parts of muriatic acid (100%) and 750 parts of water at 60° C. This solution is then poured onto ice and adjusted to 0° C., the resulting solution or suspension is diazotized in the usual manner with 37.5 parts of sodium nitrite.

104 parts of beta oxynaphthoic acid (OH:COOH=2.3) are dissolved in a solution of 23 parts of caustic soda and 1000 parts of water. An additional 59 parts of caustic soda dissolved in 700 parts of water are added and the volume and temperature adjusted to 2500 parts of solution at 20° C. The above described diazo preparation is then run in whereupon the azo coupling proceeds to completion. The dye slurry is made to 13,000 parts of solution at 40° C. and to this is added a solution prepared by dissolving 75 parts of xylyl rosin in a solution of 12 parts of caustic soda in 1000 parts of water at the boil and boiling for ½ hour. After stirring a short time the dye slurry is precipitated by running it into a boiling solution of 200 parts of calcium chloride and 5000 parts of water, boiled 20 minutes to insure development, and then washed, filtered, and dried in the usual manner.

The yield is approximately 280 parts of dry product compared to 205 parts in a charge prepared without xylyl rosin soap. The lake pigment contains about 27% of the calcium salt of xylyl rosin as a metallic substratum and is brighter in shade, cleaner and more bronzy in tone, and of good strength and texture.

*Example VII.*—A mixture of 100 parts of the sodium salt of the dyestuff 6-sulpho 4-chloro 3-toluene azo beta naphthol is pulped until a creamy paste is obtained with 1000 parts of water. The volume and temperature of the dyestuff slurry is then adjusted to 6000 parts of suspension at 25° C. In a separate container 18 parts of xylyl rosin are added to a solution of 4.5 parts of caustic soda in 400 parts of water and boiled until the formation of the soluble xylyl rosin soap is complete. The xylyl rosin soap solution is then added to a boiling solution of 12 parts of barium chloride in 1200 parts of water and boiled to complete the formation of the metallic soap. This barium salt of xylyl rosin is then added to the above dyestuff slurry and stirred until a thoro mixture is obtained. A solution of 8 parts of boric acid in 160 parts of water is then added. After stirring a short time the dyestuff slurry is brought to 90° C. and the volume adjusted to 10,000 parts of suspension, it is then slowly added to a solution of 100 parts of barium chloride in 4000 parts of water at 90° C., and after being quickly brought to the boil, boiled 15 minutes to insure completion of the development. After which, it is washed, filtered, and dried in the usual manner.

The yield is approximately 127 parts of dry product compared to 113 parts in a charge carried out in exactly the same way but without any xylyl rosin soap. The lake pigment contains about 11% of the barium salt of xylyl rosin, and possesses the usual tinctorial properties.

I claim:

1. In a process of preparing azo lakes and pigments the step of developing an aqueous suspension of an azo coloring compound in the presence of an insoluble salt of an arylated rosin compound.

2. In a process of preparing azo lakes and pigments the step of developing by heating an alkaline aqueous suspension of an insoluble salt of an azo coloring compound and an insoluble salt of an arylated rosin.

3. A lake or pigment comprising an azo coloring compound combined with a substratum comprising an insoluble salt of an arylated rosin.

4. A lake or pigment comprising a water insoluble salt of an azo coloring compound combined with a substratum comprising a water insoluble salt of an arylated rosin.

5. A lake or pigment comprising an alkaline earth metal salt of the azo compound obtained by coupling diazotized 2-naphthylamine 1-sulfonic acid with beta naphthol combined with a substantial amount of a substratum comprising an alkaline earth metal salt of an arylated rosin.

6. A lake or pigment comprising an alkaline earth metal salt of the azo compound obtained by coupling diazotized paratoluidine meta-sulfonic acid with beta oxynaphthoic acid combined with a substratum comprising an alkaline earth metal salt of an arylated rosin.

7. A lake or pigment comprising the azo compound obtained by coupling diazotized para-nitro-aniline with beta naphthol combined with a substratum comprising an alkaline earth metal salt of an arylated rosin.

ALFRED SIEGEL.